(No Model.) 2 Sheets—Sheet 1.

H. E. SMYSER.
FEEDING DEVICE FOR WEIGHING MACHINES.

No. 493,798. Patented Mar. 21, 1893.

Attest:
Walter Tamariss
Joshua M. Kack, Jr.

Inventor:
Henry E. Smyser
by his atty.
Francis T. Chambers

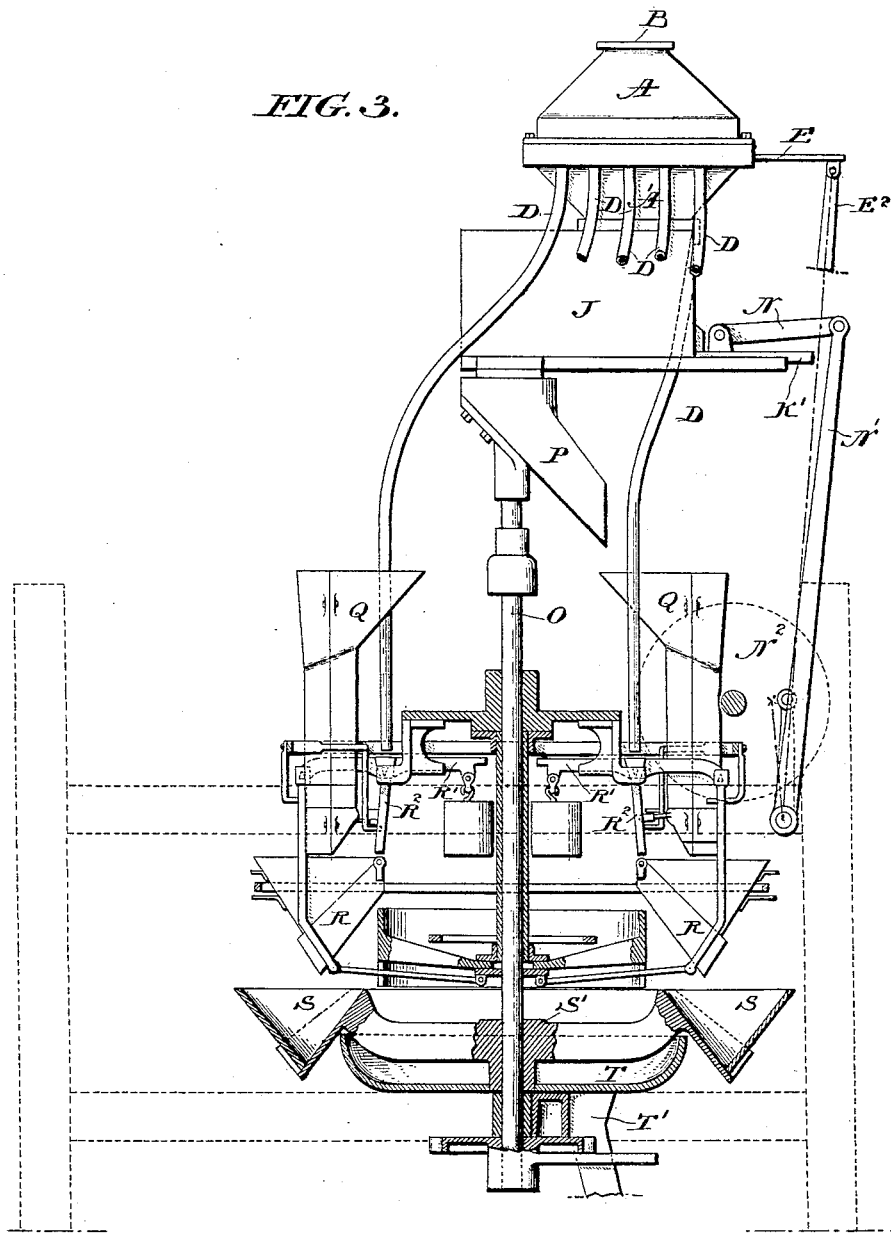

UNITED STATES PATENT OFFICE.

HENRY E. SMYSER, OF PHILADELPHIA, PENNSYLVANIA, ASSIGNOR TO ARBUCKLE BROTHERS, OF NEW YORK, N. Y.

FEEDING DEVICE FOR WEIGHING-MACHINES.

SPECIFICATION forming part of Letters Patent No. 493,798, dated March 21, 1893.

Application filed April 15, 1891. Renewed February 20, 1893. Serial No. 463,068. (No model.)

*To all whom it may concern:*

Be it known that I, HENRY E. SMYSER, of the city and county of Philadelphia, State of Pennsylvania, have invented a certain new and useful Improved Feeding Device for Weighing-Machines, of which the following is a true and exact description, reference being had to the accompanying drawings, which form a part of this specification.

My invention relates to the construction and operation of the mechanism by which material to be divided off into weighed quantities is fed to the scale pans of a weighing machine; and particularly the device is intended for use with weighing machines of the general character of that described in my Letters Patent No. 449,276, dated March 31, 1891.

The nature and mode of operation of my device will be best understood as described in connection with the drawings in which it is illustrated and in which,—

Figure 2:
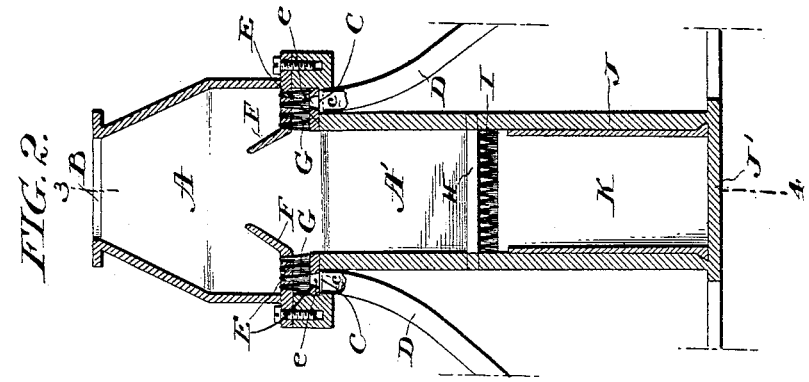
Figure 1:
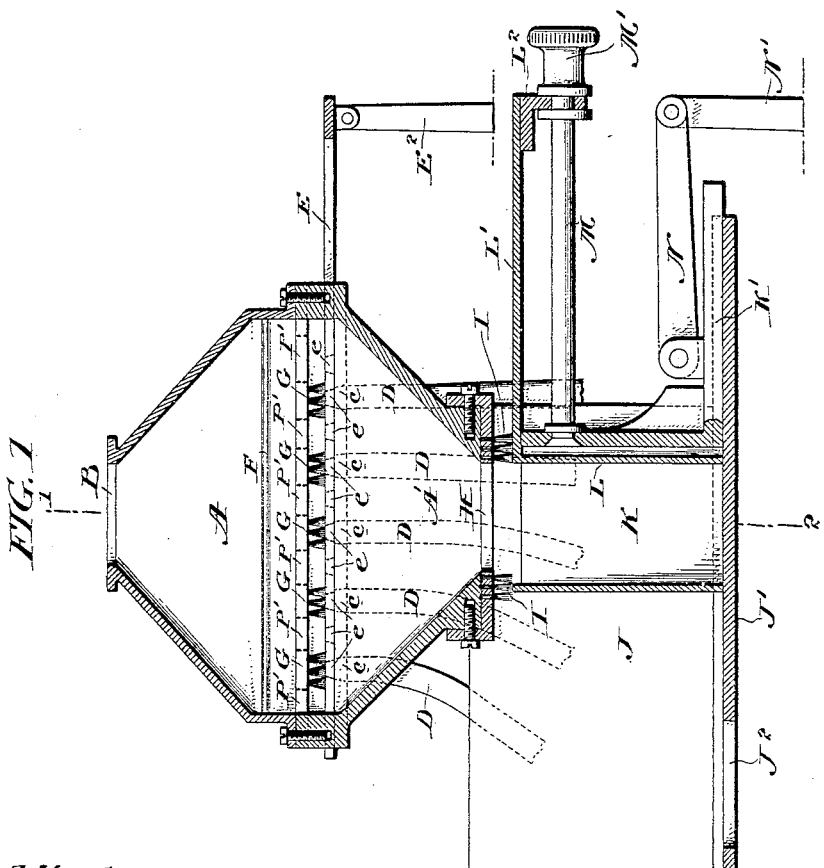

Figure 1 is a section through the hopper and reciprocating measure taken on the line 3—4 of Fig. 2. Fig. 2 is a section of the same mechanism taken on the line 1—2 of Fig. 1; and Fig. 3 an elevation partly in section showing the scales of the machine and the apparatus for feeding material to them.

My present invention is particularly intended for application to those machines in which the scale pans are filled by first dumping into them a measured quantity of material of less weight than the desired bulk and then feeding a gradual and preferably intermittent supply of the material to the scale pans to make up the determined weight. In these respects the mechanism illustrated in Fig. 3 is, as I have already stated, of the same general kind as that described in my above-named patent though the said figure of the drawings illustrates an improvement in such mechanism which forms the subject-matter of another application for Letters Patent filed April 15, 1891, Serial No. 351,090.

The apparatus as shown consists of a series of scale-pans R each mounted on one end of a counterbalanced scale-beam R' and each scale-beam having attached to it a chute $R^2$ the mouth of which extends over the scale pan when the beam is in its normal position but which, when the material in the pan overbalances the counterweight on the scale-beam swings backward until its mouth extends behind the scale pan so that material fed through it no longer falls into said pan.

Q Q are chutes situated above each scale pan; S S receiving boxes situated beneath each scale pan and into which the contents are dumped at proper intervals and from which the material is in turn dumped into bags or boxes not shown in the drawings; in the plan shown the scale pans are stationary and the receiving boxes S mounted on a rotatable hub S' so that each one can be brought to the same point to deliver its load.

T is a receptacle in which material falling from the chutes $R^2$ when they are thrown backward is caught and from which a chute T' leads to any proper receptacle.

P is a chute attached to and rotating with a shaft O in such way that its mouth will come in turn over each chute Q; the upper end of the chute P is concentric with an opening $J^2$ formed in the bottom J' of a trough-like box J; upon the bottom of the box J rests a measuring box K open at top and bottom and which has a reciprocating movement along the bottom J' of the box J from a position over the opening $J^2$ to a position under the mouth H of a feed hopper or box A A'; the measuring box is moved by a cam $N^2$ acting on a pivoted lever N' which lever is connected by a link N with an extension K' of the box. To the back of the top edge of the box K is secured a plate extension L' which, in the present case, is shown as made integral with an adjustable plate L, the horizontal and vertical plates being moved in and out by means of an adjusting screw M' attached to a rod M; brushes I I extend down from each side of the opening H in the hopper to the level of the top of the box K and it will be seen that the box K being filled by material fed to the hopper and then moved toward the opening $J^2$ will have the material brushed off to the level of its top, the plate L' serving to close the hopper when the box is moved from beneath it; the measured quantity contained in the box K falls through the opening $J^2$ into the rotating chute P, the movements of which are timed so that it will deliver each measured quantity to a different chute Q and through it to a different scale pan until the whole series of pans have received their measured supply of material.

D D D, &c., are pipes or chutes which communicate at their bottoms with the chutes R² connected with the scale beams and through which a gradual supply of material is fed to the pans to make up the determined weights in each.

In all the features above described the apparatus illustrated forms no part of my present invention and is only shown to make clear the exact functions of the devices which I am about to describe and which I desire to cover by this patent.

The hereinbefore-described mechanism is in part covered by claims in applications already pending and in part by claims of other applications which I am about to file.

Referring now again to the drawings, and particularly to Figs. 1 and 2 thereof, it will be seen that the feed hopper A A' is provided at some distance above its bottom with side ledges C, which ledges are pierced with holes $c, c$ said holes communicating each with a pipe D; resting and movable upon the ledges C are slides E having perforations $e$ formed in them which register intermittently with the openings $c$ of the ledges. As shown the slides E consist of straight plates which are given a reciprocating movement by means of levers E² actuated by cams or other mechanism which I have not thought it necessary to show in the drawings; a portion of the material falling through the hopper A A' will fall upon or may be directed upon the slides E and when the perforations of such slides register with the openings in the ledges that portion which fills the slide perforations will fall through the openings $c$ to the corresponding pipe or chute D and thence be delivered through the chute R² to the scale pan. Brushes as illustrated at G G, &c., should be permanently secured above each opening $c$ and with their edges resting on the slides E; these brushes serve the double purpose of pushing the material falling upon the slides into the perforations $e$ and of pushing all material not contained in said perforations from above them just before they register with the openings $c$. In order to insure that a proper supply of material should constantly fall upon the slides I prefer to provide my device with deflecting plates P extending out toward the center of the hopper and which of course will guide material falling within their edges onto the slides. As shown the brushes G are attached to the plates P, openings P' being formed between the brushes as indicated in dotted lines in Fig. 1.

Having now described my invention, what I claim as new, and desire to secure by Letters Patent, is—

1. In a weighing machine, the combination with a feed-hopper and a series of scales, of means for feeding graduated streams of material to the scales consisting of chutes leading to the scales from discharge openings in said hopper, and a reciprocating slide having perforations moving over said openings, and arranged to be filled with material from said hopper and by the movement of the slide to carry the material over said openings and discharge it through them into said chutes.

2. In a weighing machine, the combination with a series of scales, a feed-hopper, and a measuring box supplied from said hopper and acting intermittently to deliver charges of material to the respective scales, of means for feeding graduated streams of material to the scales consisting of chutes leading to the scales from discharge openings in said hopper, and a reciprocating slide having perforations moving over said openings, and arranged to be filled with material from said hopper and by the movement of the slide to carry the material over said openings and discharge it through them into said chutes.

3. A hopper having a ledge C on one or more sides, said ledge being pierced with holes $c$, in combination with a moving slide E resting on said ledge and pierced with holes $e$ which, during its movements, register intermittently with the holes $c$.

4. A hopper having a ledge C on one or more sides, said ledge being pierced with holes $c$, in combination with a moving slide E resting on said ledge and pierced with holes $e$ which, during its movements, register intermittently with the holes $c$; and a deflecting plate or plates F extending out toward the center of the hopper and adapted to direct some of the material fed to the hopper on to the slide E.

5. A hopper having a ledge C on one or more sides, said ledge being pierced with holes $c$, in combination with a moving slide E resting on said ledge and pierced with holes $e$ which, during its movements, register intermittently with the holes $c$; and a series of brushes G arranged to sweep material falling on slides E over their surfaces and into the holes therein.

H. E. SMYSER.

Witnesses:
LEWIS R. DICK,
JOSHUA MATLACK, Jr.